(12) United States Patent
Rodriguez (10) Patent No.: US 11,798,305 B1
(45) Date of Patent: Oct. 24, 2023

(54) METHODS AND SYSTEMS FOR DETERMINING THE AUTHENTICITY OF AN IDENTITY DOCUMENT

(71) Applicant: Raphael A. Rodriguez, Marco Island, FL (US)

(72) Inventor: Raphael A. Rodriguez, Marco Island, FL (US)

(*) Notice: Subject to any disclaimer, the term of this patent is extended or adjusted under 35 U.S.C. 154(b) by 0 days.

(21) Appl. No.: 18/324,536

(22) Filed: May 26, 2023

(51) Int. Cl.
| | |
|---|---|
| *G06K 9/00* | (2022.01) |
| *G06V 30/42* | (2022.01) |
| *G06V 10/44* | (2022.01) |
| *G06V 10/77* | (2022.01) |
| *G06V 10/74* | (2022.01) |
| *G06V 10/764* | (2022.01) |
| *G06V 30/414* | (2022.01) |

(52) U.S. Cl.
CPC ............ *G06V 30/42* (2022.01); *G06V 10/443* (2022.01); *G06V 10/761* (2022.01); *G06V 10/764* (2022.01); *G06V 10/7715* (2022.01); *G06V 30/414* (2022.01)

(58) Field of Classification Search
CPC ...... G06V 40/10; G06V 40/40; G06V 10/426; G06V 10/431; G06V 10/44; G06V 10/751; G06V 20/647; G06V 30/1988; G06V 30/413; G06V 30/418; G06V 30/422; G06V 40/14; G06V 40/166; G06V 40/169; G06V 40/45; G06V 40/50; G06V 40/70; G06V 10/774; G06V 30/41; G06V 40/168; G06V 40/172

See application file for complete search history.

(56) References Cited

U.S. PATENT DOCUMENTS

| | | | | |
|---|---|---|---|---|
| 2004/0066850 | A1* | 4/2004 | Nakajima | ............... G06T 5/007 375/240.19 |
| 2020/0387700 | A1* | 12/2020 | Wu | ...................... G06V 30/413 |
| 2021/0142144 | A1* | 5/2021 | Han | ........................ G06N 3/063 |

* cited by examiner

*Primary Examiner* — Alex Kok S Liew
(74) *Attorney, Agent, or Firm* — Kevin McDermott, Esq.

(57) ABSTRACT

A method for determining the authenticity of an identity document is provided that includes capturing, by an electronic device, image data of an identity document, determining a class of the identity document, and extracting, using multi-resolution convolution and octave convolution techniques, first and second frequency components from the captured image data. The first and second frequency components correspond to different spatial frequency ranges. Moreover, the method includes determining whether the first and second frequency components satisfy matching criteria with data in corresponding frequency maps. The frequency maps are created from verified documents belonging to the determined class of document. In response to determining at least one of the first and second frequency components satisfies the matching criteria, determining the identity document is genuine.

10 Claims, 5 Drawing Sheets

FIG. 8

METHODS AND SYSTEMS FOR DETERMINING THE AUTHENTICITY OF AN IDENTITY DOCUMENT

BACKGROUND OF THE INVENTION

This invention relates generally to authenticating identity documents, and more particularly, to methods and systems for determining the authenticity of an identity document.

Individuals conduct transactions with many different service providers in person and remotely over the Internet. Network-based transactions conducted over the Internet may involve, for example, opening a bank account or similar account using a website or mobile application. Service providers typically require successfully identifying an individual before he or she is permitted to open a bank account or conduct any other type of network-based transaction involving sensitive information.

Service providers typically require individuals to upload an image of his or her identity document, like a driver's license or a passport, and a claim of identity to facilitate authentication. The uploaded images are typically analyzed to determine whether the identity document in the uploaded image is authentic, not tampered with, jurisdictionally accurate, and unexpired. The analysis may be manual or automatic.

Imposters have been known to impersonate individuals by providing a false claim of identity supported by a fraudulent identity document when attempting to deceive a service provider into concluding the imposter is the person he or she claims to be. Such impersonations are known as spoofing. Additionally, impostors have been known to use many methods to obtain or create fraudulent identity documents. For example, imposters have been known to alter identity documents by laminating another person's image onto their own identity document or to change the text of another person's identity document. The imposters upload images of the altered documents, for example, when attempting to open a bank account. Such fraudulent identity documents are difficult to detect using known techniques. Consequently, opening a banking account or other type of similar account with an uploaded image of an identity document captured at a remote location depends on verifying the identity document in the uploaded image is authentic.

Methods for determining the authenticity of an identity document are known to use octave convolution techniques to represent and process input feature maps at multiple spatial frequencies, or resolutions, simultaneously. However, such techniques do not adequately extract features from identity documents, are sensitive to noise and variations in conditions during image capture, are not as computationally efficient as desired, and do not allow for satisfactory information exchange between different resolutions.

Thus, it would be advantageous and an improvement over the relevant technology to provide a method and a computer capable of enhancing feature extraction from identity documents, enhancing robustness to noise and variations in conditions during image capture, enhances computational efficiency, reduces computational complexity, and enhances information exchange between different resolutions.

BRIEF DESCRIPTION OF THE INVENTION

An aspect of the present disclosure provides a method for determining the authenticity of an identity document comprising the step of capturing, by an electronic device, image data of an identity document. Moreover, the method includes the steps of extracting, using multi-resolution convolution and octave convolution techniques, first and second frequency components from the captured image data. The first and second frequency components correspond to different spatial frequency ranges. Furthermore, the method includes the step of determining whether the first and second frequency components satisfy matching criteria with data in corresponding frequency maps. The frequency maps are created from verified documents belonging to the determined class of document. In response to determining at least one of the first and second frequency components satisfies the matching criteria, the method includes determining the identity document is genuine.

In one embodiment of the present disclosure the step of determining the identity document is fraudulent in response to determining neither the first nor the second frequency component satisfies the matching criteria.

In another embodiment of the present disclosure, the step of determining whether at least one of the first and second frequency components satisfy matching criteria with corresponding frequency maps includes comparing the first frequency component against a first frequency map corresponding to the same frequency range as the first frequency component, calculating a first similarity score based on the comparison, comparing the first similarity score against a threshold score, and determining the first frequency component satisfies the matching criteria when the similarity score satisfies the threshold score.

In yet another embodiment of the present disclosure the step of determining whether at least one of the first and second frequency components satisfy matching criteria with corresponding frequency maps includes comparing the second frequency component against a second frequency map corresponding to the same frequency range as the second frequency component, calculating a second similarity score based on the comparison, comparing the second similarity score against a threshold score, and determining the second frequency component satisfies the matching criteria when the similarity score satisfies the threshold score.

In another embodiment of the present disclosure the method further includes comparing the second frequency component against a second frequency map corresponding to the same frequency range as the second frequency component, calculating a second similarity score based on the comparison, comparing the second similarity score against the threshold score, and determining the second frequency component satisfies the matching criteria when the second similarity score satisfies the threshold score. The first and second frequency components are combined to create a collective frequency component which is compared against a frequency map corresponding to the same frequency range as the collective frequency component. The frequency map is created from the first and second frequency maps. A collective similarity score is calculated based on the comparison. The collective similarity score is compared against the threshold score. The collective frequency component is determined to satisfy the matching criteria when the collective similarity score satisfies the threshold score. In response to determining that at least two of the first, second and collective frequency components satisfy the matching criteria, the identity document is determined to be genuine.

In yet another embodiment of the present disclosure, the method includes determining the identity document is fraudulent in response to determining that at least two of the first, second and collective frequency components do not satisfy the matching criteria.

In yet another embodiment of the present disclosure, the method includes determining that the image data includes at least one region of interest. The at least one region of interest is in the first frequency component only.

In yet another embodiment of the present disclosure, the method further includes comparing the first frequency component that includes the at least one region of interest against a corresponding at least one region of interest in the first frequency map.

In yet another embodiment of the present disclosure, the method further includes determining the image data includes at least one region of interest, comparing the first frequency component that includes the at least one region of interest against a first frequency map corresponding to the same frequency range as the first frequency component, and comparing the second frequency component that includes the at least one region of interest against a second frequency map corresponding to the same frequency range as the second frequency component.

In yet another embodiment of the present disclosure, the method further includes extracting the first frequency components from the image using a high pass filter, and extracting the second frequency components from the image using a low pass filter.

Another aspect of the present disclosure provides an electronic device for determining authenticity of an identity document including a processor and a memory configured to store data. The electronic device is associated with a network and the memory is in communication with the processor and has instructions stored thereon which, when read and executed by the processor, cause the electronic device to receive image data of an identity document, determine a class of the identity document, and extract, using multi-resolution convolution and octave convolution techniques, first and second frequency components from the captured image data. The first and second frequency components correspond to different spatial frequency ranges.

The instructions when read and executed by the processor, further cause the electronic device to determine whether the first and second frequency components satisfy matching criteria with data in corresponding frequency maps. The frequency maps are created from verified documents belonging to the determined class of document. In response to determining at least one of the first and second frequency components satisfies the matching criteria, the instructions when read and executed by the processor, further cause the electronic device to determine the identity document is genuine.

In an embodiment of the present disclosure, the instructions when read and executed by the processor, further cause the electronic device to determine the identity document is fraudulent in response to determining neither the first nor the second frequency component satisfies the matching criteria.

In another embodiment of the present disclosure, the instructions when read and executed by the processor, cause the electronic device to compare the first frequency component against a first frequency map corresponding to the same frequency range as the first frequency component, calculate a first similarity score based on the comparison, compare the first similarity score against a threshold score, and determine the first frequency component satisfies the matching criteria when the similarity score satisfies the threshold score.

In yet another embodiment of the present disclosure, the instructions when read and executed by the processor, cause the electronic device to compare the second frequency component against a second frequency map corresponding to the same frequency range as the second frequency component, calculate a second similarity score based on the comparison, compare the second similarity score against a threshold score, and determine whether the second frequency component satisfies the matching criteria when the second similarity score satisfies the threshold score.

In yet another embodiment of the present disclosure, the instructions when read and executed by the processor, further cause the electronic device to compare the second frequency component against a second frequency map corresponding to the same frequency range as the second frequency component, calculate a second similarity score based on the comparison, compare the second similarity score against the threshold score, and determine the second frequency component satisfies the matching criteria when the second similarity score satisfies the threshold score. The instructions when read and executed by the processor, further cause the electronic device to combine the first and second frequency components to create a collective frequency component, and compare the collective frequency component against a frequency map corresponding to the same frequency range as the collective frequency component. The frequency map is created from the first and second frequency maps.

The instructions when read and executed by the processor, further cause the electronic device to calculate a collective similarity score based on the comparison, compare the collective similarity score against the threshold score, and determine the collective frequency component satisfies the matching criteria when the collective similarity score satisfies the threshold score. In response to determining that at least two of the first, second and collective frequency components satisfy the matching criteria, the instructions when read and executed by the processor, further cause the electronic device to determine the identity document is genuine.

In yet another embodiment of the present disclosure, the instructions when read and executed by the processor, further cause the electronic device to determine the identity document is fraudulent in response to determining that at least two of the first, second and collective frequency components do not satisfy the matching criteria.

In yet another embodiment of the present disclosure, the instructions when read and executed by the processor, further cause the electronic device to determine that the image data includes at least one region of interest. The at least one region of interest being in the first frequency component only.

In yet another embodiment of the present disclosure, the instructions when read and executed by the processor, further cause the electronic device to compare the first frequency component that includes the at least one region of interest against a corresponding at least one region of interest in the first frequency map.

In yet another embodiment of the present disclosure, the instructions when read and executed by the processor, further cause the electronic device to determine the image data includes at least one region of interest, compare the first frequency component that includes the at least one region of interest against a first frequency map corresponding to the same frequency range as the first frequency component, and compare the second frequency component that includes the at least one region of interest against a second frequency map corresponding to the same frequency range as the second frequency component.

In another embodiment of the present disclosure, the instructions when read and executed by the processor, further cause the electronic device to extract the first frequency components from the image using a high pass filter, and extract the second frequency components from the image using a low pass filter.

DETAILED DESCRIPTION OF THE INVENTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the example embodiments described herein can be made without departing from the spirit and scope of the present disclosure.

Figure 1:
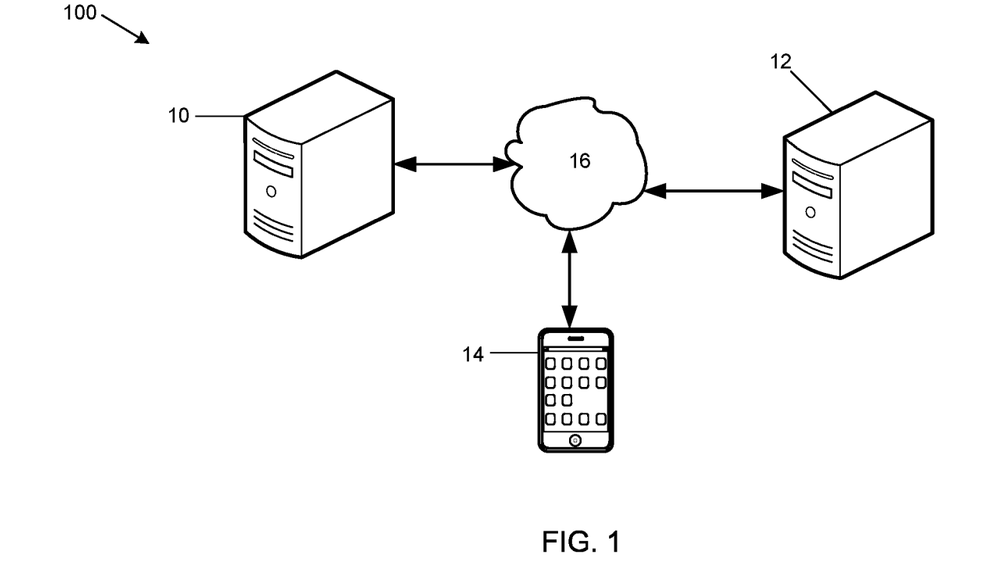
FIG. 1 is a schematic diagram of an example computing system for determining the authenticity of an identity document according to an embodiment of the present disclosure.

FIG. 1 is a schematic diagram of an example computing system 100 for determining the authenticity of an identity document according to an embodiment of the present disclosure. As shown in FIG. 1, the main elements of the system 100 include an electronic device 10, a server 12, and a hand-held electronic device 14 communicatively connected via a network 16.

In FIG. 1, the electronic device 10 may be any type of server or computer implemented as a network server or network computer. The electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device that may be included in the system 100. Other examples of the electronic device 10 include, but are not limited to, a cellular phone, any wireless hand-held consumer electronic device, a smart phone, a tablet computer, a phablet computer, a laptop computer, and a personal computer (PC).

The server 12 can be, for example, any type of server or computer implemented as a network server or network computer similar to the electronic device 10. The hand-held electronic device 14 may be any type of hand-held electronic device capable of at least capturing any kind of image data and audio data. The hand-held electronic device 14 is typically associated with a single person who operates the device 14. The person who is associated with and operates the hand-held electronic device 14 is referred to herein as a user.

The server 12 is an electronic device so may be alternatively referred to as such. Additionally, the electronic device 10, the server 12, and the hand-held electronic device 14 may each be considered an information system so may alternatively be referred to as an information system.

The server 12 and the hand-held electronic device 14 can also be any electronic device capable of at least downloading applications over the Internet, running applications, capturing and storing data temporarily and/or permanently, and otherwise performing any and all functions, methods and/or algorithms described herein by any computer, computer system, server or electronic device that may be included in the system 100.

The network 16 may be implemented as a 5G communications network. Alternatively, the network 16 may be implemented as any wireless network including, but not limited to, 4G, 3G, Wi-Fi, Global System for Mobile (GSM), Enhanced Data for GSM Evolution (EDGE), and any combination of a LAN, a wide area network (WAN) and the Internet. The network 16 may also be any type of wired network or a combination of wired and wireless networks.

It is contemplated by the present disclosure that the number of electronic devices 10, servers 12, and hand-held electronic devices 14 is not limited to the number shown in the system 100. Rather, any number of electronic devices 10, servers 12, and hand-held electronic device 14 may be included in the system 100.

Figure 2:
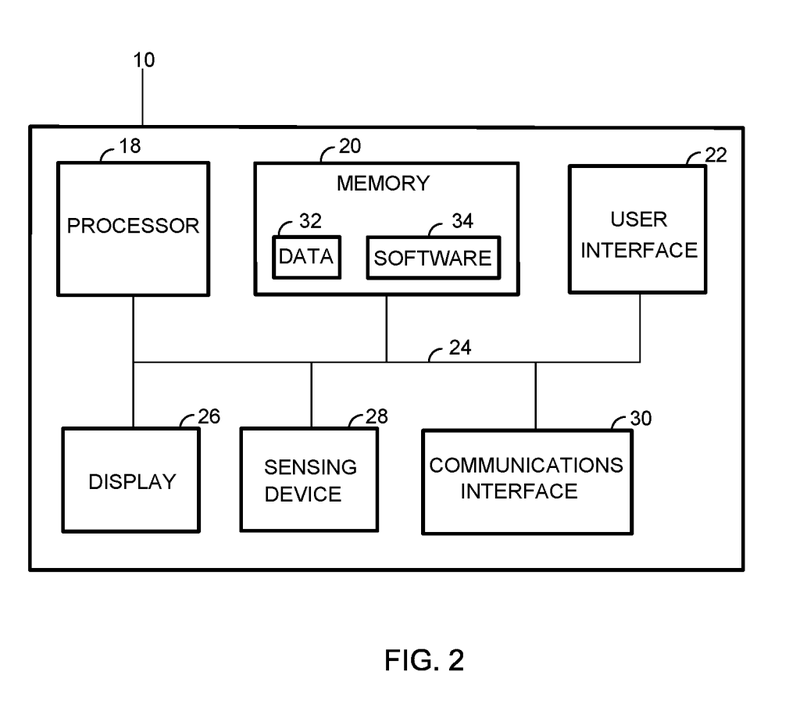
FIG. 2 is a more detailed schematic diagram of an example electronic device included in the system shown in FIG. 1.

FIG. 2 is a more detailed schematic diagram of the electronic device 10 for determining the authenticity of an identity document according to an embodiment of the present disclosure. The electronic device 10 includes components such as, but not limited to, one or more processors 18, a memory 20, a user interface 22, a bus 24, a display 26, a sensing device 28, and a communications interface 30. General communication between the components in the electronic device 10 is provided via the bus 24.

The electronic device 10 may be any type of server or computer implemented as a network server or network computer. The electronic device 10 can be any electronic device capable of at least downloading applications over the Internet, running applications, capturing and storing data temporarily and/or permanently, and otherwise performing any and all functions, methods and/or algorithms described herein by any computer, computer system, server or electronic device that may be included in the system 100. Other examples of the electronic device 10 include, but are not limited to, a cellular phone, any wireless hand-held consumer electronic device, a smart phone, a tablet computer, a phablet computer, a laptop computer, and a personal computer (PC).

The processor 18 executes software instructions, or computer programs, stored in the memory 20. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing at least a portion of the functions and/or methods described herein. The above examples are not intended to limit in any way the definition and/or meaning of the term "processor."

The memory 20 may be any non-transitory computer-readable recording medium. Non-transitory computer-readable recording media may be any tangible computer-based device implemented in any method or technology for short-term and long-term storage of information or data. Moreover, the non-transitory computer-readable recording media may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), and disc drive or the like. Furthermore, the non-transitory computer-readable recording media may be implemented as smart cards, SIMs, any type of physical and/or virtual storage, or any other digital source such as a network or the Internet from which computer programs, applications or executable instructions can be read.

The memory 20 may be used to store any type of data 32, such as, but not limited to, types and classes of identity documents, data for training machine learning algorithms to determine the authenticity of identity documents, frequency maps for different classes of documents, frequency components, a data record for each identity document class, image data of identity documents, identifying information for a person to whom an identity document was issued, sets of similarity score calculation parameters, and threshold values. Identity documents include, but are not limited to, passports, driver's licenses, and identity cards. A frequency map represents a distribution of data for multiple distinct frequency ranges associated with a document. The frequency ranges can be, for example, an amplitude.

Additionally, the memory 20 can be used to store any type of software 34. As used herein, the term "software" is intended to encompass an executable computer program that exists permanently or temporarily on any non-transitory computer-readable recordable medium that causes the electronic device 10 to perform at least a portion of the functions, methods, and/or algorithms described herein. Application programs are software and include, but are not limited to, operating systems, Internet browser applications, computer programs that analyze and determine the authenticity of identity documents, machine learning algorithms, trained machine learning models, convolutional neural networks, computer programs for implementing octave convolution, computer programs for implementing multi-resolution convolution, and any other software and/or any type of instructions associated with algorithms, processes, or operations for controlling the general functions and operations of the electronic device 10. The software may also include computer programs that implement buffers and use RAM to store temporary data.

The user interface 22 and the display 26 allow interaction between a user and the electronic device 10. The display 26 may include a visual display or monitor that displays information. For example, the display 26 may be a Liquid Crystal Display (LCD), an active matrix display, plasma display, or cathode ray tube (CRT). The user interface 22 may include a keypad, a camera, a keyboard, a mouse, an illuminator, a signal emitter, a microphone, and/or speakers.

Moreover, the user interface 22 and the display 26 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the electronic device 10 to enter data, change settings, control functions, etc. Consequently, when the touch screen is touched, the user interface 22 communicates this change to the processor 18 and settings can be changed or user entered information can be captured and stored in the memory 20.

The sensing device 28 may include Radio Frequency Identification (RFID) components or systems for receiving information from other devices (not shown) and for transmitting information to other devices. The sensing device 28 may alternatively, or additionally, include components with Bluetooth, Near Field Communication (NFC), infrared, or other similar capabilities. Communications between the electronic device 10 and other devices (not shown) may occur via NFC, RFID, Bluetooth or the like only so a network connection from the electronic device 10 is unnecessary.

The communications interface 30 may include various network cards, and circuitry implemented in software and/or hardware to enable wired and/or wireless communications with other devices (not shown). Communications include, for example, conducting cellular telephone calls and accessing the Internet over a network. By way of example, the communications interface 30 may be a digital subscriber line (DSL) card or modem, an integrated services digital network (ISDN) card, a cable modem, or a telephone modem to provide a data communication connection to a corresponding type of telephone line. As another example, the communications interface 30 may be a local area network (LAN) card (e.g., for Ethernet™ or an Asynchronous Transfer Model (ATM) network) to provide a data communication connection to a compatible LAN. As yet another example, the communications interface 30 may be a wire or a cable connecting the electronic device 10 with a LAN, or with accessories such as, but not limited to, other electronic devices. Further, the communications interface 30 may include peripheral interface devices, such as a Universal Serial Bus (USB) interface, a PCMCIA (Personal Computer Memory Card International Association) interface, and the like.

The communications interface 30 also allows the exchange of information across the network 16 between the electronic device 10 and any other device (not shown). The exchange of information may involve the transmission of radio frequency (RF) signals through an antenna (not shown).

The server 12 and the hand-held electronic device 14 may include the same, similar, or additional components as described herein with regard to the electronic device 10. For example, the hand-held electronic device 14 may additionally include a gyroscope and/or an accelerometer. The gyroscope and accelerometer generate data regarding rotation and translation of the hand-held electronic device 14.

The hand-held electronic device 14 may also include a camera for capturing image data. As used herein, capture means to record data temporarily or permanently, for example, image data of identity documents. The camera can be one or more imaging devices configured to record image data of identity documents of a user while utilizing the hand-held electronic device 14. Moreover, the camera is capable of recording image data under any lighting conditions including infrared light. Image data may be a digital image, a sequence of digital images, or a video.

The camera may be integrated into the hand-held electronic device 14 as one or more front-facing cameras and/or one or more rear facing cameras that each incorporates a sensor, for example and without limitation, a CCD or CMOS sensor. Alternatively, the camera can be external to the hand-held electronic device 14. The electronic device 10 and the server 12 may also include a similar camera.

Identity documents may be one of three different card types. The card types are ID-1, ID-2 and ID-3. International standards defining the size of each card type have been established. For example, the international standard for ID-1 card types requires that the card be rectangular with dimensions of 85.60 millimeters (mm) by 53.98 mm, and have rounded corners with a radius in the range of 2.88 mm to 3.48 mm. Cards implemented using the ID-1 card type standard include, but are not limited to, credit cards, debit cards, identification cards, hunting licenses and driver's licenses. Example implementations of the ID-2 card type standard include travel visas and Romanian identity cards. An example implementation of the ID-3 card type standard is a passport.

Each different implementation using the ID-1 card type standard may be considered a different class. As a result, there are several thousand different classes. For example, driver's licenses implemented using the ID-1 standard may be considered one class, credit cards implemented using the ID-1 standard may be considered another class, and hunting licenses implemented using the ID-1 standard may represent yet another class.

It is contemplated by the present disclosure that the driver's license implemented using the ID-1 standard issued by each U.S. state constitutes a different class. Thus, for example, a driver's license issued by the state of Virginia belongs to a different class than a driver's license issued by the state of Florida. Similarly, the driver's licenses issued by different provinces, for example, in Canada constitute different classes. Thus, for example, a driver's license issued by the province of Quebec belongs to a different class than a driver's license issued by the province of Ontario. Moreover, driver's licenses issued in different years constitute a different class. Thus, for example, a Virginia driver's license issued in 2018 belongs to a different class than a Virginia driver's license issued in 2021. Commercial driver's licenses also constitute a different class of document.

Figure 3:
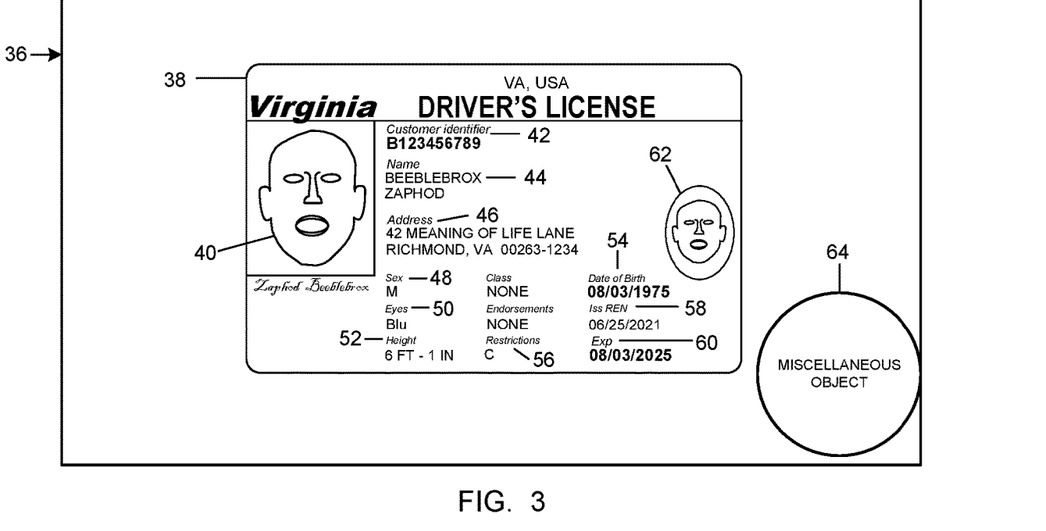
FIG. 3 is a diagram illustrating image data including an image of an example identity document implemented using the ID-1 card type.

FIG. 3 is a diagram illustrating image data 36 including an image of an example identity document 38 implemented using the ID-1 card type standard. An example first side of the identity document 38 is shown. The example identity document 38 is a driver's license. However, it is contemplated by the present disclosure that the identity document 38 may alternatively be any identity document used by a person to prove a claim of identity, for example, a passport or an identification card. The image data 36 may be captured with the hand-held electronic device 14, or any camera or device included in the system 100 capable of communicating with the electronic device 10 via the network 16.

The identity document 38 includes an image 40 of the person to whom the identity document was issued and identifying information. Identifying information may include information about the person to whom the identity document 38 was issued as well as general information relating to the identity document 38. The identifying information can include, but is not limited to, a customer identifier 42 as well as the person's name 44, address 46, sex 48, eye color 50, height 52, and date of birth 54. Identity information can also include, but is not limited to, restrictions 56 the person is required to comply with while driving, the issue renewal date 58, the expiration date 60 of the identity document 38, and the state and/or country that issued the identity document 38. The identity information is typically in text which may be obtained or extracted from the identity document 38 using optical character recognition (OCR) techniques. All images, identifying information and any other information included on the first side of the identity document 38 complies with the criteria established for the class to which the identity document 38 belongs. The identity document 38 also includes a transparent window 62 including the image of the person, and may also include a kinegram (not shown), a hologram (not shown), laser perforations (not shown) or a water mark (not shown).

Identity documents typically include features or areas that can be used to facilitate determining the authenticity of the document. The features or areas are referred to herein as regions of interest. For the identity document 38, example regions of interest can include, but are not limited to, the entire identity document 38, the image 40, any text that appears on the document 38, and security features in the document 38. One or more regions of interest may be analyzed to determine the authenticity of an identity document. For example, the region of interest may be the entire identity document 38. Alternatively, the region of interest may be the image 40, the name 44 of the person to whom the identity document was issued, the customer identifier 42, and the transparent window 62. It is contemplated by the present disclosure that any combination of regions of interest may be analyzed to facilitate determining the authenticity of an identity document.

Regions of interest are determined for each class of identity document and can be used to determine the authenticity of identity documents in the respective class. Any number of regions of interest for a class of identity document may be used to determine the authenticity of an identity document in that class. Moreover, a different frequency class may be used for each region of interest. For example, a first region of interest may have a first frequency class with a range of 0.25-4 cycles per mm, a second region of interest may have a second frequency class with a range of 20-40 cycles per mm, and a third region of interest may have a third frequency class for frequencies +50 cycles per mm.

Different regions of interest within an identity document may exhibit distinct frequency characteristics. This means that certain regions of interest may contain information that is best analyzed or verified using specific frequency components or frequency ranges. By assigning different frequency classes to each region of interest within identity documents of a certain class, unique frequency information present in different parts of the identity document can be effectively captured and processed. This allows conducting a more detailed analysis and authentication of identity documents, taking into account the specific frequency characteristics associated with each region of interest.

Certain regions of interest may be prioritized over others by assigning weights, for example, when computing similarity scores for a given identity document. Each region of interest can be assigned a weight parameter, such as w_1, w_2, and w_3, respectively, and expected frequency component features, such as R1, R2, and R3, are identified and stored as a frequency map for the certain identity document class. While determining whether or not an identity document is authentic, the weights assigned to each region of interest are used to compute a similarity score for the identity document.

A region of interest can be a security feature included in an identity document. Security features include, but are not limited to, Guilloche patterns, holograms, holographic laminates, iridescent substrates, kinegrams, laser perforations, microprinting or nano-printing, metallized diffractive optically variable image devices (D.O.V.D.S.), metallic substrates, optically variable ink (O.V.I.), pearlescent substrates, tactile features, and transparent windows.

Security features may also be found or included in the printing process, inks, substrate, or any combination of the foregoing. Physical security features that provide distinct reflecting patterns may additionally, or alternatively, be included in identity documents. Reflections off the physical security features may be used to facilitate determining the authenticity of an identity document.

The identity document 38 includes information that occurs at a low frequency and different information that occurs at a high frequency. Information that occurs at the low frequency includes, but is not limited to, general shapes and outlines, tactile elements, water marks, and large patterns and details, for example, the layout of the identity document 38. Lower frequency information occurs within a lower spatial frequency range than higher frequency information. Information that occurs at a high frequency includes fine textures and details in the image data of the identity document 38 such as, but not limited to, the textual information of the identity document 38, or various printing features such as, but not limited to, guilloche lines, microprinting, and ink strokes. Higher frequency information occurs within a higher spatial frequency range than the low frequency information.

The low frequency information is extracted from the image data of the identity document 38 using a low-pass filter, while the high frequency information is extracted from the image data of the identity document 38 using a high-pass filter. The low frequency information may be extracted by, for example, a low pass Gaussian filter. Low pass Gaussian filters are used in signal processing and image processing to reduce high-frequency noise, or details, in an image. Gaussian filters allow low-frequency components or smooth variations in the image information to pass through the filter while attenuating high-frequency components or sharp transitions.

The Gaussian filter is based on the Gaussian distribution, which is a bell-shaped curve, and convolves captured image data with a Gaussian window. The window is a two-dimensional matrix of values derived from the Gaussian function. Higher weights are assigned to the central pixels and the weights gradually decrease as the distance from the center increases, following the shape of the Gaussian distribution. When the low pass Gaussian filter is applied to captured image data, the high-frequency details are blurred and the low-frequency components are retained resulting in a smoother version of the original captured image data. This filter is commonly used in various applications such as image denoising, edge detection, and feature extraction.

The high frequency information may be extracted by, for example, a high pass Laplacian filter which is a type of image filter used in signal processing and image processing to enhance high-frequency details or edges in an image. The Laplacian filter is a second-order derivative filter that emphasizes areas of rapid intensity changes in an image, such as edges or corners. It calculates a Laplacian operator on the image, which measures the rate of change of intensity at each pixel location. Positive values indicate bright-to-dark transitions which are typically indicative of edges and negative values indicate dark-to-bright transitions. The Laplacian filter is applied to the image after the Gaussian filter. As a result, the resulting image enhances the high frequency details or edges by subtracting the smoothed version from the original image. High-pass Laplacian filters are commonly used for edge detection, image sharpening and feature enhancement. As a result, such filters facilitate enhancing fine details and cause edges to be more prominent.

In the context of ID document liveness detection, the present disclosure contemplates the utilization of High-pass Laplacian filters and low pass Gaussian filters to identify fraudulent identity documents that have been rendered from sources such as computer screens, color copies, or simple laminated pictures, rather than genuine government-issued documents. By applying high and low frequency filters to the processed identity document images, certain characteristics or features that indicate the presence of screen edges or the edges of a photograph or paper can be detected. Identity document images that have been filtered and do not exhibit these specific features are classified as "live" and considered genuine. Conversely, identity document images that exhibit these features are categorized as "fraudulent." The use of these filters aids in distinguishing between genuine and fraudulent ID documents in terms of their liveness.

Each combination of region of interest and frequency range is a frequency component. Frequency maps for an identity document class include at least the frequency components for the class of document. However, some frequency components are more useful than others for determining the authenticity of an identity document. As a result, instead of including all the frequency components for a class of identity document, frequency maps for a class of identity document may include only those frequency components deemed most useful for determining the authenticity of an identity document in that class.

Image data 36 is frequently captured by users informally photographing their own identity documents 38. For example, users may photograph identity documents 38 positioned on the kitchen table, a dresser, a desk or a bureau. As a result, image data 36 of identity documents 38 frequently includes one or more miscellaneous objects 64. Miscellaneous objects 64 may be any kind or type of object deliberately or accidentally included in the image data 36 of the identity document 38. For example, a miscellaneous object 64 may be a coffee mug, comb, brush, sandwich, pen, pencil, computer, tool or weapon. The number of miscellaneous objects 64 is not limited to the number shown. Rather, any number of miscellaneous objects 64 may be included in the image data 36 of the identity document 38.

Miscellaneous objects 64 are typically irrelevant to analyzing the identity document 38 so are not used for analyzing the identity document 38. As a result, the miscellaneous objects 64 are typically removed from the image data 36 by cropping the image data 36 to include the identity document 38 only. Alternatively, the miscellaneous data 64 may be removed in any other manner. Additionally, after cropping, depending on the size and orientation of the identity document 38, the cropped image data 36 may be normalized to manipulate the identity document 38 into a size and orientation for proper analysis. Normalizing includes, but is not limited to, rotating, scaling, and de-skewing the image data, and perhaps correcting the image data for lighting caused by shadow, blur, and glare.

Figure 4:
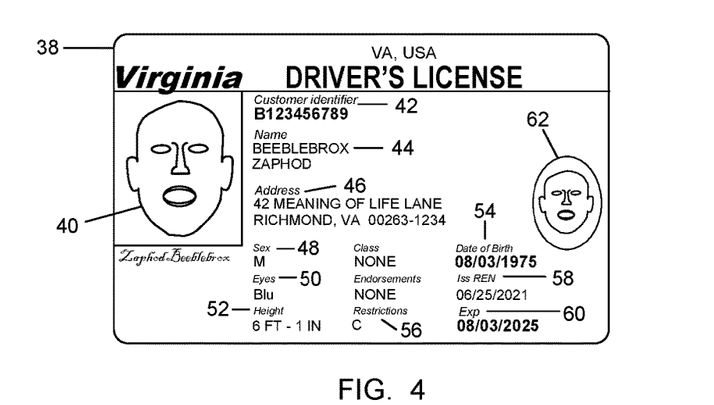
FIG. 4 is a diagram illustrating the example identity document.

FIG. 4 is a diagram illustrating the image data 36 after cropping so includes the identity document 38 only. Cropped image data 36 may be stored in the memory 20 of the electronic device 10, the server 12, the hand-held electronic device 14 or any other computer server or electronic device capable of communicating via the network 16 that may be included in the system 100.

Figure 5:
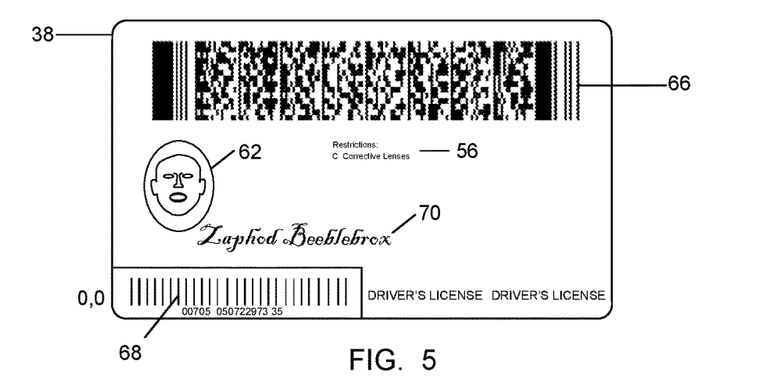
FIG. 5 is a diagram illustrating an image of an example second side of the example identity document.

FIG. 5 is a diagram illustrating an image of an example second side of the identity document 38 implemented using the ID-1 card type standard. The image may be captured with the electronic device 10, the hand-held electronic device 14, or any other device included in the system 100 capable of communicating with the electronic device 10 via the network 16.

The second side of the identity document includes a PDF417 barcode 66, a one-dimensional barcode 68, the transparent window 62 of the person for whom the license was issued, the restrictions 56 the person is required to comply with while driving, and the person's signature 70. The information on the second side of the identity document 38 complies with the established criteria for the class of the identity document 38.

Service providers typically require individuals to upload an image of his or her identity document, like a driver's license or a passport, and a claim of identity to facilitate authentication. The uploaded images are typically analyzed to determine whether the identity document in the uploaded image is authentic. Imposters have been known to impersonate individuals by providing a false claim of identity supported by fraudulent identity documents when attempting to deceive a service provider into concluding the imposter is the person he or she claims to be. Additionally, impostors have been known to use many methods to obtain or create fraudulent identity documents. For example, imposters have been known to laminate another person's image onto their own identity document or to alter the text of another person's identity document. The imposters upload images of the altered documents, for example, when opening a bank account. Such fraudulent identity documents are difficult to detect by known systems.

Methods for determining the authenticity of an identity document are known to incorporate octave convolution techniques to represent and process input feature maps at multiple spatial frequencies, or resolutions, simultaneously. However, such techniques do not adequately extract features from identity documents, are sensitive to noise and variations in conditions during image capture, are not as computationally efficient as desired, and do not allow for satisfactory information exchange between different resolutions.

To address these problems image data of an identity document may be captured by, for example, a camera associated with the electronic device 10 or with the hand-held electronic device 14. The class of the identity document may be determined, and first and second frequency components can be extracted from the captured image data using multi-resolution convolution and octave convolution techniques. The first and second frequency components correspond to different spatial frequency ranges. The electronic device 10, for example, can be used to determine whether the first and second frequency components satisfy matching criteria with data in corresponding frequency maps. The frequency maps are created from verified documents belonging to the determined class of document. In response to determining at least one of the first and second frequency components satisfies the matching criteria, determining the identity document is genuine.

Figure 6:
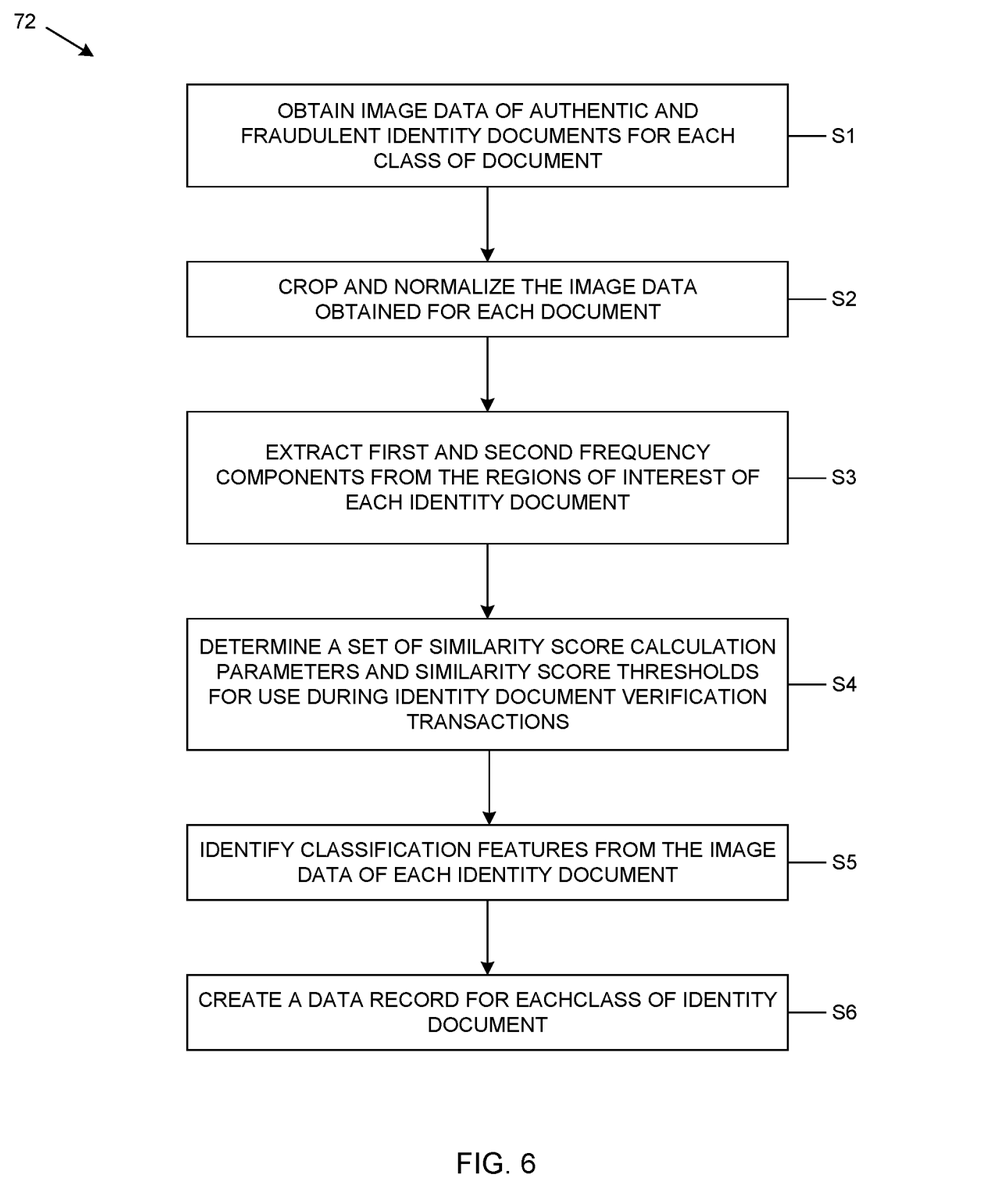
FIG. 6 is a flowchart illustrating an example method and algorithm for training a machine learning model to determine the authenticity of identity documents according to an embodiment of the present disclosure.

FIG. 6 is a flowchart 72 illustrating an example method and algorithm for training a machine learning model to determine the authenticity of identity documents according to an embodiment of the present disclosure. FIG. 6 illustrates example steps performed when the electronic device 10 runs software 34 stored in the memory 20 to train a model for determining the authenticity of identity documents.

In step S1, the software 34 executed by the processor 18 causes the electronic device 10 to obtain image data 36 of authentic and fraudulent identity documents for each class of document. The electronic device 10 may capture image data of the identity documents or may receive image data of the identity documents from other sources. The obtained image data 36 for each document includes an image of an identity document.

In step S2 the software 34 executed by the processor 18 causes the electronic device 10 to crop and normalize the image data obtained for each document. The image data 36 may be cropped to include the identity document only and normalized to manipulate the identity document into a size and orientation for proper analysis. Normalizing the image data 36 includes, but is not limited to, rotating, scaling, de-skewing, and perhaps correcting the image data for lighting caused by shadow, blur, and glare. The image data 36 may also be processed to remove noise and to adjust for contrast.

Each class of identity document has different regions of interest. Moreover, different regions of interest within an identity document may exhibit distinct frequency characteristics. This means that certain regions of interest may contain information that is best analyzed or verified using specific frequency components or frequency ranges. By assigning different frequency classes to each region of interest within identity documents of a certain class, unique frequency information present in different parts of the identity document can be effectively captured and processed. This allows conducting a more detailed analysis and authentication of identity documents.

Next, in step S3, the software 34 executed by the processor 18 causes the electronic device 10 to extract first and second frequency components from the regions of interest of each identity document. More specifically, the electronic device 10 uses frequency analysis techniques to extract frequency components from the image data of each identity document. Doing so involves decomposing the image data of each identity document into multiple scale or frequency bands. Frequency analysis techniques that may be used include a combination of octave convolution and multi-resolution convolution techniques. Additionally, the electronic device 10 filters the extracted frequency components to isolate desired information, for example, high and low frequency components included in the extracted frequency components. The electronic device 10 can use, for example, a low-pass Gaussian filter to extract the low frequency components and a high-pass Laplacian filter to extract the high frequency components from the extracted frequency components.

In step S4, the software 34 executed by the processor 18 causes the electronic device 10 to determine a set of similarity score calculation parameters and similarity score thresholds for use during identity document verification transactions. Techniques such as gradient descent may be used to optimize the similarity score calculation parameters. The set of similarity score calculation parameters may be used to compute a similarity score for identity documents while evaluating the authenticity of authentication documents. The similarity score calculation parameters can be determined on either an identity document basis or a region of interest (ROI) basis.

Certain regions of interest may be prioritized over others by assigning a same or different weight to each region of interest. For example, each region of interest can be assigned a weight parameter, such as $w\_1$, $w\_2$, and $w\_3$, respectively, and expected frequency components, such as R1, R2, and R3, may be identified. The weight parameters, high frequency components, and low frequency components together constitute a frequency map. It is contemplated by the present disclosure that a frequency map may created for each region of interest within an identity document, or for the entire identity document. The frequency maps may be stored in the electronic device 10.

High and low frequency components that are useful for determining authenticity are included in the frequency map. A frequency component is determined to be useful based on its ability to capture relevant information for determining the authenticity of an identity document. Extracted high and low frequency components that consistently demonstrate significant variations or distinctive patterns between genuine and fraudulent documents are considered useful. The usefulness of frequency components can also be evaluated based on the reliable and discriminative information provided about specific security features or patterns present in the identity document. For example, if a certain frequency component effectively captures the details of a holographic feature that is difficult to replicate, the certain frequency component would be deemed useful.

Next, in step S5, the software 34 executed by the processor 18 causes the electronic device 10 to identify classification features of each identity document that can be used to classify each document. Example features include, but are not limited to, certain fixed character strings that appear on every document included in the identity document class like "Virginia" or "New York" on a driver's license. The identified features may include, but are not limited to, regions of interest, extracted high and low frequency components for the regions of interest, weight parameters assigned to the regions of interest, and frequency classes assigned to the regions of interest.

Next, in step S6, the software 34 executed by the processor 18 causes the electronic device 10 to create a data record for each class of identity document. The created data record includes data such as but not limited to, the classification features, the regions of interest, the frequency classes for the regions of interest, and the frequency maps created for the class of identity document.

Any number of identity documents for each class of identity document may be used for training the machine learning algorithm that facilitates generating accurate and trustworthy results regarding the authenticity of documents in the respective class. The identity documents may be entered into the machine learning model being trained any number of times, for example, 100 times that facilitates training a machine learning model capable of generating accurate and trustworthy results regarding the authenticity of identity documents in different classes.

When the criteria defining the end of training have been satisfied, in step S6, training is complete and the software 34 executed by the processor 18 causes the electronic device 10 to create a data record for each class of identity document. The created data record includes data such as, but not limited to, classification features, regions of interest, frequency classes for the regions of interest, and frequency maps. Moreover, when the criteria defining the end of training have been satisfied, in step S6, the trained machine learning model can be deemed operable to accurately determine the authenticity of identity documents.

Figure 7:
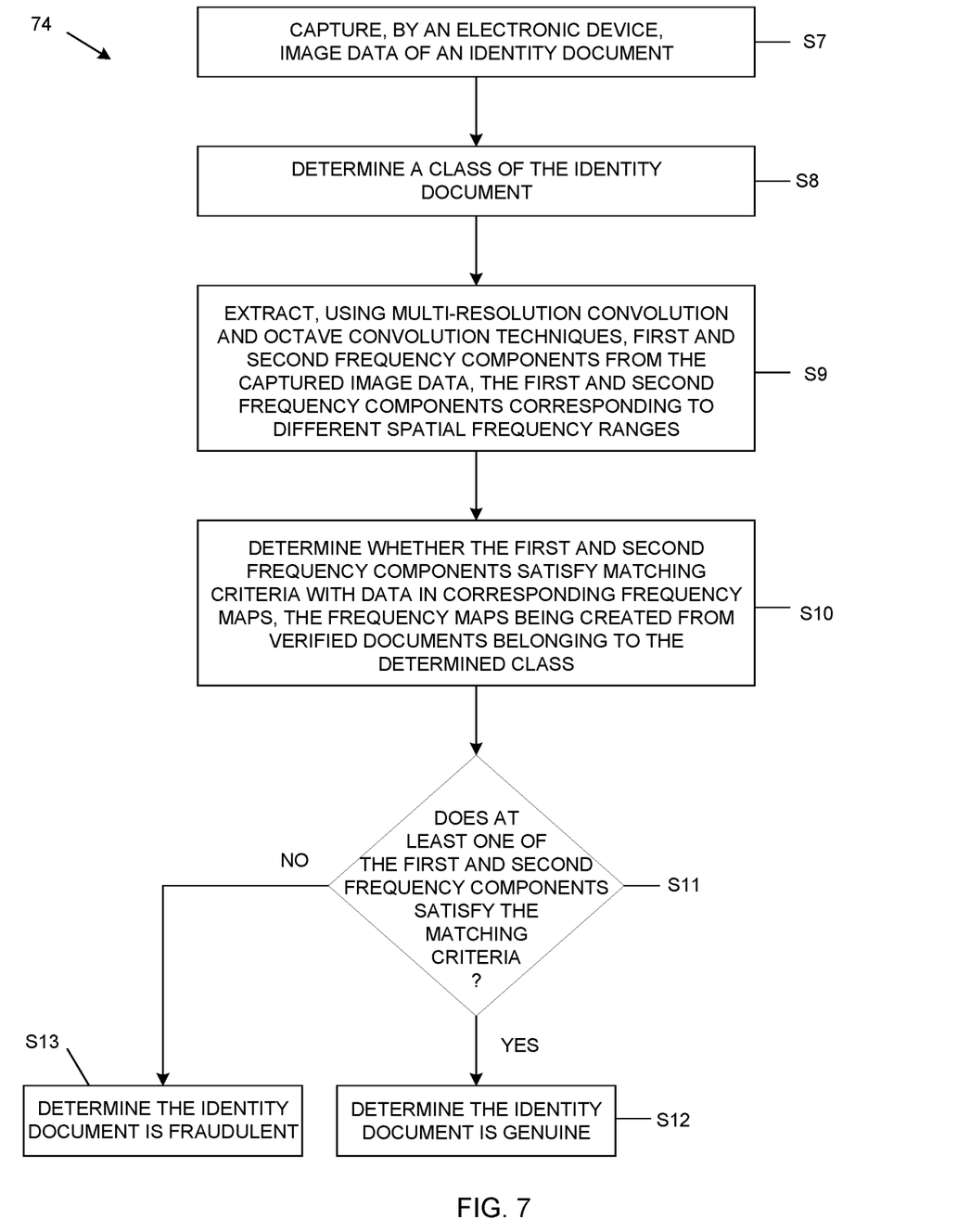
FIG. 7 is a flowchart illustrating an example method and algorithm for determining the authenticity of an identity document according to an embodiment of the present disclosure.

FIG. 7 is a flowchart 74 illustrating an example method and algorithm for determining the authenticity of an identity document that may be implemented by a machine learning model trained to determine the authenticity of identity documents, for example, as described herein with regard to the flowchart illustrated in FIG. 6. FIG. 7 illustrates example steps performed when the electronic device 10 runs software 34 stored in the memory 20 to determine the authenticity of an identity document.

In step S7, the software 34 executed by the processor 18 causes the electronic device 10 to capture image data of an identity document. Alternatively, the hand-held electronic device 14 can be used to capture image data of an identity document if the electronic device 10 does not have a camera for capturing image data. The hand-held electronic device 14 can transmit the captured image data to the electronic device 10 via the network 16. The image data may be cropped and normalized if necessary.

Next, in step S8, the software 34 executed by the processor 18 causes the electronic device 10 to determine a class of the identity document. Identity documents may be one of three different card types. The card types are ID-1, ID-2, and ID-3. Cards implemented using the ID-1 card type standard include, but are not limited to, credit cards, debit cards, identification cards, hunting licenses and driver's licenses. Each different implementation using the ID-1 card type standard may be considered a different class. As a result, there are several thousand different classes. For example, driver's licenses implemented using the ID-1 standard may be considered one class, credit cards implemented using the ID-1 standard may be considered another class, and hunting licenses implemented using the ID-1 standard may represent yet another class.

Next, in step S9, the software 34 executed by the processor 18 causes the electronic device 10 to extract, using multi-resolution convolution and octave convolution techniques, first and second frequency components from the captured image data. The first and second frequency components correspond to different spatial frequency ranges. The first frequency component can be a low frequency component while the second frequency component can be a high frequency component. The first and second frequency components can be extracted from each region of interest for the determined class of document.

More specifically, the electronic device 10 uses frequency analysis techniques to extract frequency components from the image data of the identity document. Doing so involves decomposing the image data of the identity document into multiple scale or frequency bands. Frequency analysis techniques that may be used include a combination of octave convolution and multi-resolution convolution techniques. Additionally, the electronic device 10 filters the extracted frequency components to isolate desired information, for example, high and low frequency components included in the extracted frequency components.

The image data of the identity document includes information that occurs at a low frequency and different information that occurs at a high frequency. Information that occurs at the low frequency includes, but is not limited to, general shapes and outlines, tactile elements, water marks, and large patterns and details, for example, the layout of the identity document. Lower frequency information occurs within a lower spatial frequency range than higher frequency information. Information that occurs at a high frequency includes fine textures and details in the image data of the identity document such as, but not limited to, the textual information of the identity document, or various printing features such as, but not limited to, guilloche lines, microprinting, and ink strokes. Higher frequency information occurs within a higher spatial frequency range than the low frequency information.

The low frequency information is extracted from the image data of the identity document as the low frequency component using a low-pass filter, while the high frequency information is extracted from the image data of the identity document as the high frequency component using a high-pass filter. The low frequency component may be extracted by, for example, a low pass Gaussian filter while the high frequency component may be extracted by, for example, a high pass Laplacian filter.

In step S10, the software 34 executed by the processor 18 causes the electronic device 10 to determine whether the first and second frequency components satisfy matching criteria with data in corresponding frequency maps. The frequency maps are created from verified documents belonging to the determined class.

More specifically, the extracted high and low frequency components are compared against the corresponding high and low frequency components in the frequency map for the determined class of document. The differences generated as a result of the comparisons are used to calculate a similarity score for the low frequency components and another similarity score for the high frequency components. Each similarity score is compared against a threshold value. When at least one of the similarity scores satisfies the threshold value, in step S11, the matching criteria are satisfied. Next, in step S12, the software 34 executed by the processor 18 causes the electronic device 10 to determine the identity document is genuine.

However, if neither similarity score satisfies the threshold value, in step S11, the matching criteria are not satisfied. Next, in step S13, the software 34 executed by the processor 18 causes the electronic device 10 to determine the identity document is fraudulent.

The threshold value may be satisfied when a calculated similarity score is less than or equal to the threshold value. Other threshold values may be satisfied when the calculated similarity score is equal to or greater than the threshold value. Alternatively, the threshold value may include multiple threshold values, each of which is required to be satisfied to satisfy the threshold value.

The information shown in FIG. 8 includes some of the same information shown in FIG. 7 as described in more detail below. As such, features illustrated in FIG. 8 that are identical to features illustrated in FIG. 7 are identified using the same reference numerals used in FIG. 7.

Figure 8:
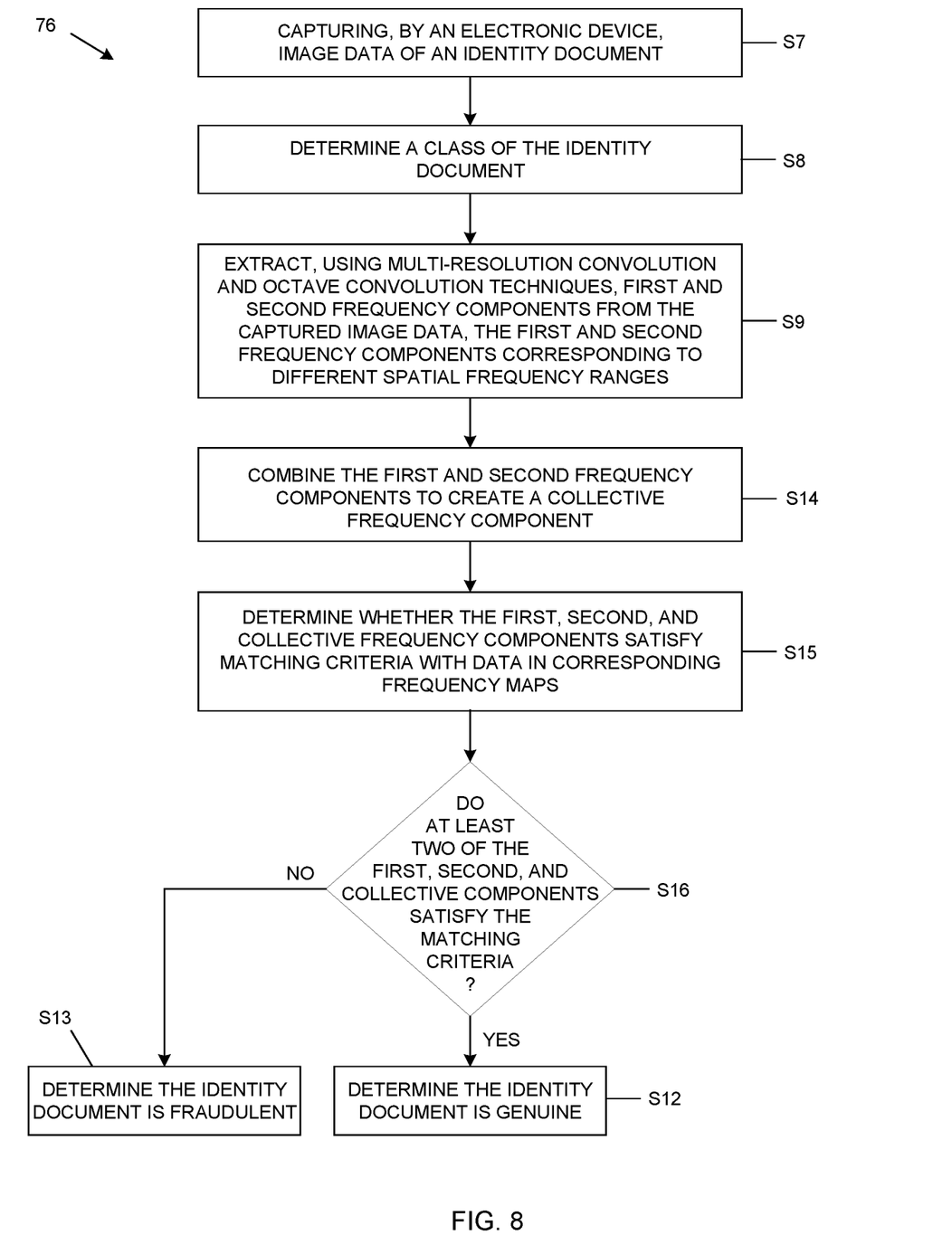
FIG. 8 is a flowchart illustrating another example method and algorithm for determining the authenticity of an identity document according to another embodiment of the present disclosure.

FIG. 8 is a flowchart 76 illustrating another example method and algorithm for determining the authenticity of an identity document that may be implemented by a machine learning model trained to determine the authenticity of identity documents, for example, as described herein with regard to the flowchart illustrated in FIG. 6. FIG. 8 illustrates example steps performed when the electronic device 10 runs software 34 stored in the memory 18 to determine the authenticity of an identity document.

This method is similar to that shown in FIG. 7. However, after extracting, in step S9, the first and second frequency components from the captured image data, in step S14, the software 34 executed by the processor 18 causes the electronic device 10 to combine the first and second frequency components to create a collective frequency component. The data record for the determined class of identity document includes a frequency map that includes a corresponding collective frequency component.

Next, in step S15, the software 34 executed by the processor 18 causes the electronic device 10 to determine whether the first, second, and collective frequency components satisfy matching criteria with data in corresponding frequency maps. More specifically, the created collective frequency component is compared against the collective frequency component from the record frequency map. The difference generated as a result of the comparison is used to calculate a similarity score. The similarity score is compared against the threshold value. When at least two of the similarity scores calculated for the low frequency component, the high frequency component and the collective frequency component satisfy the threshold value, in step S16, the matching criteria are satisfied. Next, in step S12, the software 34 executed by the processor 18 causes the electronic device 10 to determine the identity document is genuine.

However, if at least two of the similarity scores do not satisfy the threshold value, in step S16, the matching criteria are not satisfied. Next, in step S13, the software 34 executed by the processor 18 causes the electronic device 10 to determine the identity document is fraudulent.

Although the methods and algorithms described herein determine the authenticity of an identity document based on spatial frequency components, it is contemplated by the present disclosure that the authenticity of the document may additionally, or alternatively, be verified using other information on identity documents. For example, the authenticity of an identity document may be verified by comparing security features such as holograms, kinegrams, emboss features, perforations, watermarks, or microprint against the corresponding features included in the data record for the determined identity document class. Another example could include comparing information from the identity document such as the person's name, photo and date of birth, against corresponding information in the data record for the determined identity document class. Yet another example, could be performing additional frequency component analyses on certain regions of interest such as the signature or the barcode. The identity document's authenticity may also be verified with the entity who issued the document. It is contemplated by the present disclosure that any combination of the foregoing may be used to determine the authenticity of an identity document.

Using the methods and algorithms for determining the authenticity of an identity document as described herein enable efficiently capturing and representing information across different spatial scales, which provides a comprehensive evaluation of an image's authenticity. Moreover, using the method and algorithms for determining the authenticity of an identity document as described herein enable detecting minute differences between authentic and forged images, thereby enhancing the accuracy of identity document verification results. Furthermore, using the method and algorithms for determining the authenticity of an identity document as described herein enable adequately extracting features from identity documents, enable enhancing sensitivity to noise and variations in conditions during image capture, enable reducing computational efficiency, and facilitate satisfactory information exchange between different resolutions. In view of the above, it can be seen that the methods and algorithms facilitate enhancing the accuracy and trustworthiness of identity document review results while enhancing security and facilitating a reduction in costs incurred due to spoofing.

It is contemplated by the present disclosure that the example methods and algorithms described herein may be conducted entirely by the electronic device 10; partly by the electronic device 10 and partly by the server 12; partly by the electronic device 10, partly by the server 12 and partly by the hand-held electronic device 14; partly by the hand-held electronic device 14 and partly by the server 12; entirely by the hand-held electronic device 14; or, by any other combination of other servers (not shown), electronic devices (not shown), or computers (not shown) operable to communicate with the electronic device 10, the server 12, and the hand-held electronic device 14 via the network 16. Furthermore, data described herein as being stored in the electronic device 10 may alternatively, or additionally, be stored in any other server (not shown), electronic device (not shown), or computer (not shown) operable to communicate with the electronic device 10 via the network 16.

Additionally, the example methods and algorithms described herein may be implemented with any number and organization of computer program components. Thus, the methods and algorithms described herein are not limited to specific computer-executable instructions. Alternative example methods and algorithms may include different computer-executable instructions or components having more or less functionality than described herein.

The example methods and/or algorithms described above should not be considered to imply a fixed order for performing the method and/or algorithm steps. Rather, the method and/or algorithm steps may be performed in any order that is practicable, including simultaneous performance of at least some steps. Moreover, the method and/or algorithm steps may be performed in real time or in near real time. It should be understood that for any method and/or algorithm described herein, there can be additional, fewer, or alternative steps performed in similar or alternative orders, or in parallel, within the scope of the various embodiments, unless otherwise stated. Furthermore, the invention is not limited to the embodiments of the methods and/or algorithms described above in detail.

What is claimed is:

1. A method for determining the authenticity of an identity document comprising the steps of:
   capturing, by an electronic device, image data of an identity document;
   determining a class of the identity document;
   extracting, using multi-resolution convolution and octave convolution techniques, first and second frequency components from the captured image data, the first and second frequency components corresponding to different spatial frequency ranges;
   comparing the first frequency component against a first frequency map corresponding to the same frequency range as the first frequency component;
   calculating a first similarity score based on said comparing step;
   comparing the first similarity score against a threshold score;
   determining the first frequency component satisfies the matching criteria when the similarity score satisfies the threshold score;
   comparing the second frequency component against a second frequency map corresponding to the same frequency range as the second frequency component, the frequency maps being created from verified documents belonging to the determined class of document;
   calculating a second similarity score based on said comparing step;
   comparing the second similarity score against the threshold score;
   determining the second frequency component satisfies the matching criteria when the second similarity score satisfies the threshold score;
   combining the first and second frequency components to create a collective frequency component;
   comparing the collective frequency component against a frequency map corresponding to the same frequency range as the collective frequency component, the frequency map created from the first and second frequency maps;
   calculating a collective similarity score based on said comparing the collective frequency component step;
   comparing the collective similarity score against the threshold score;
   determining the collective frequency component satisfies the matching criteria when the collective similarity score satisfies the threshold score; and
   in response to determining that at least two of the first, second and collective frequency components satisfy the matching criteria, determining the identity document is genuine.

2. The method according to claim 1, further comprising in response to determining that at least two of the first, second and collective frequency components do not satisfy the matching criteria, determining the identity document is fraudulent.

3. The method according to claim 1, further comprising determining that the image data includes at least one region of interest, the at least one region of interest being in the first frequency component only.

4. The method according to claim 3, said comparing step further comprising comparing the first frequency component that includes the at least one region of interest against a corresponding at least one region of interest in the first frequency map.

5. The method according to claim 1, said extracting step comprising:
   extracting the first frequency components from the image using a high pass filter; and
   extracting the second frequency components from the image using a low pass filter.

6. An electronic device for determining authenticity of an identity document comprising:
   a processor; and
   a memory configured to store data, said electronic device being associated with a network and said memory being in communication with said processor and having instructions stored thereon which, when read and executed by said processor, cause said electronic device to:
   receive image data of an identity document;
   determine a class of the identity document;

extract, using multi-resolution convolution and octave convolution techniques, first and second frequency components from the captured image data, the first and second frequency components corresponding to different spatial frequency ranges;

compare the first frequency component against a first frequency map corresponding to the same frequency range as the first frequency component;

calculate a first similarity score based on the comparison;

compare the first similarity score against a threshold score;

determine the first frequency component satisfies the matching criteria when the similarity score satisfies the threshold score;

compare the second frequency component against a second frequency map corresponding to the same frequency range as the second frequency component, the frequency maps being created from verified documents belonging to the determined class of document;

calculate a second similarity score based on the comparison;

compare the second similarity score against the threshold score;

determine the second frequency component satisfies the matching criteria when the second similarity score satisfies the threshold score;

combine the first and second frequency components to create a collective frequency component;

compare the collective frequency component against a frequency map corresponding to the same frequency range as the collective frequency component, the frequency map created from the first and second frequency maps;

calculate a collective similarity score based on the comparison;

compare the collective similarity score against the threshold score;

determine the collective frequency component satisfies the matching criteria when the collective similarity score satisfies the threshold score; and in response to determining that at least two of the first, second and collective frequency components satisfy the matching criteria, determine the identity document is genuine.

7. The electronic device according to claim 6, wherein the instructions when read and executed by said processor, cause said electronic device to determine the identity document is fraudulent in response to determining that at least two of the first, second and collective frequency components do not satisfy the matching criteria.

8. The electronic device according to claim 6, wherein the instructions when read and executed by said processor, cause said electronic device to determine that the image data includes at least one region of interest, the at least one region of interest being in the first frequency component only.

9. The electronic device according to claim 8, wherein the instructions when read and executed by said processor, cause said electronic device to compare the first frequency component that includes the at least one region of interest against a corresponding at least one region of interest in the first frequency map.

10. The electronic device according to claim 6, wherein the instructions when read and executed by said processor, cause said electronic device to:
extract the first frequency components from the image using a high pass filter; and
extract the second frequency components from the image using a low pass filter.

\* \* \* \* \*